G. R. NAPIER.
MEAT CHOPPING MACHINE.
APPLICATION FILED OCT. 23, 1919.
1,346,096.
Patented July 6, 1920.
3 SHEETS—SHEET 2.
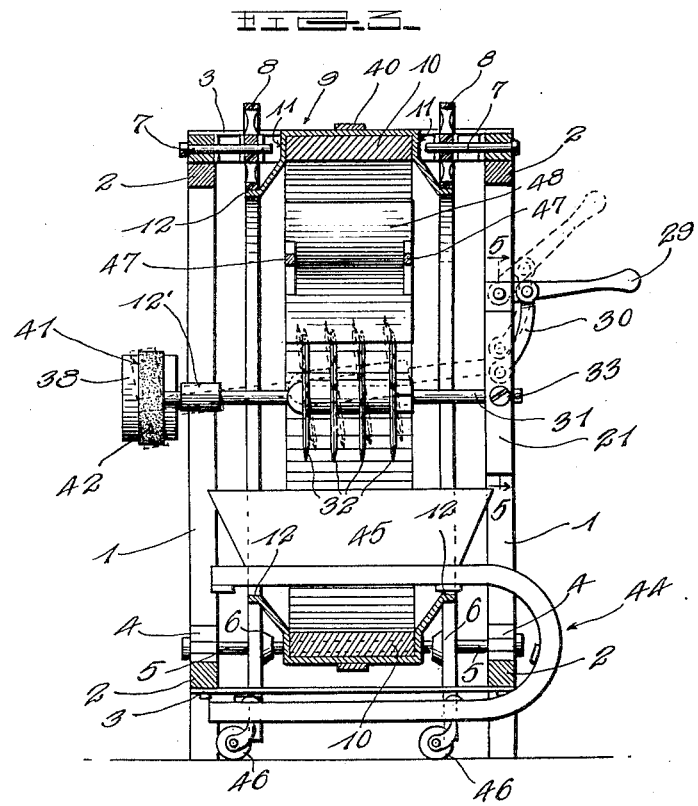
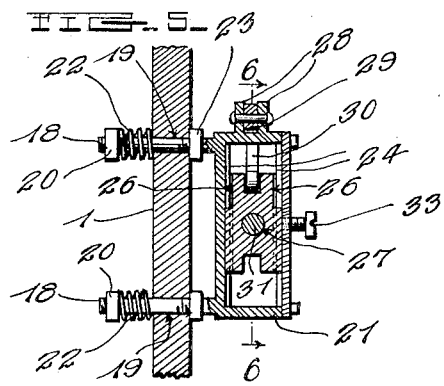
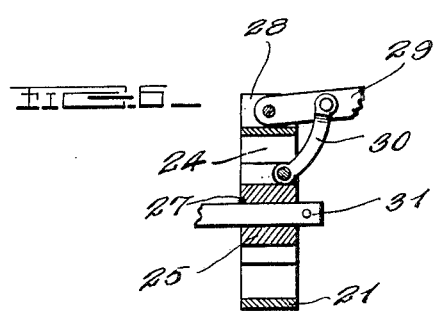
Inventor
GEORGE R. NAPIER
Witness
By H. R. Wilson & Co.
Attorneys G. R. NAPIER.
MEAT CHOPPING MACHINE.
APPLICATION FILED OCT. 23, 1919.
1,346,096.
Patented July 6, 1920.
3 SHEETS—SHEET 3.
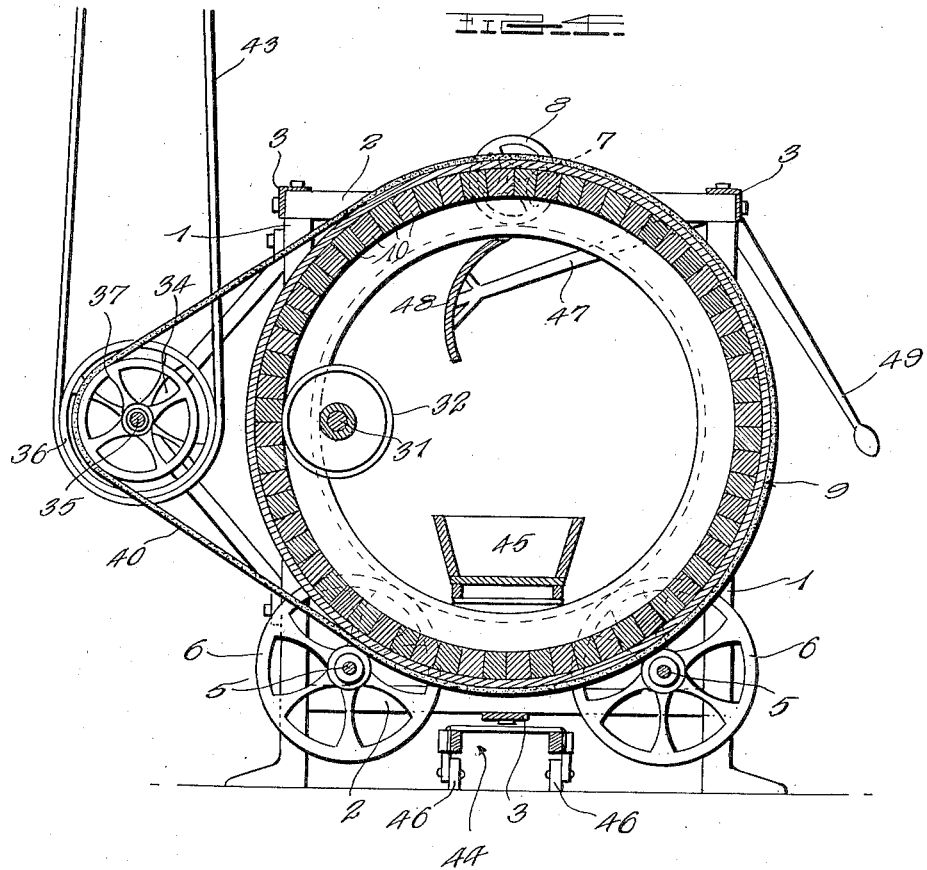
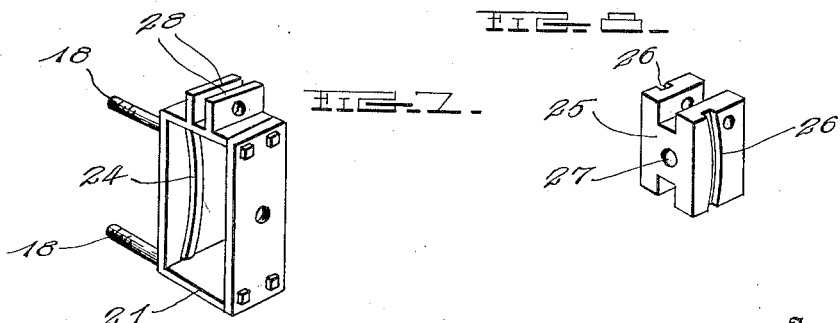
Witness:
George W. Giovannetti
Inventor
GEORGE R. NAPIER
By H. B. Willson & Co.
Attorneys

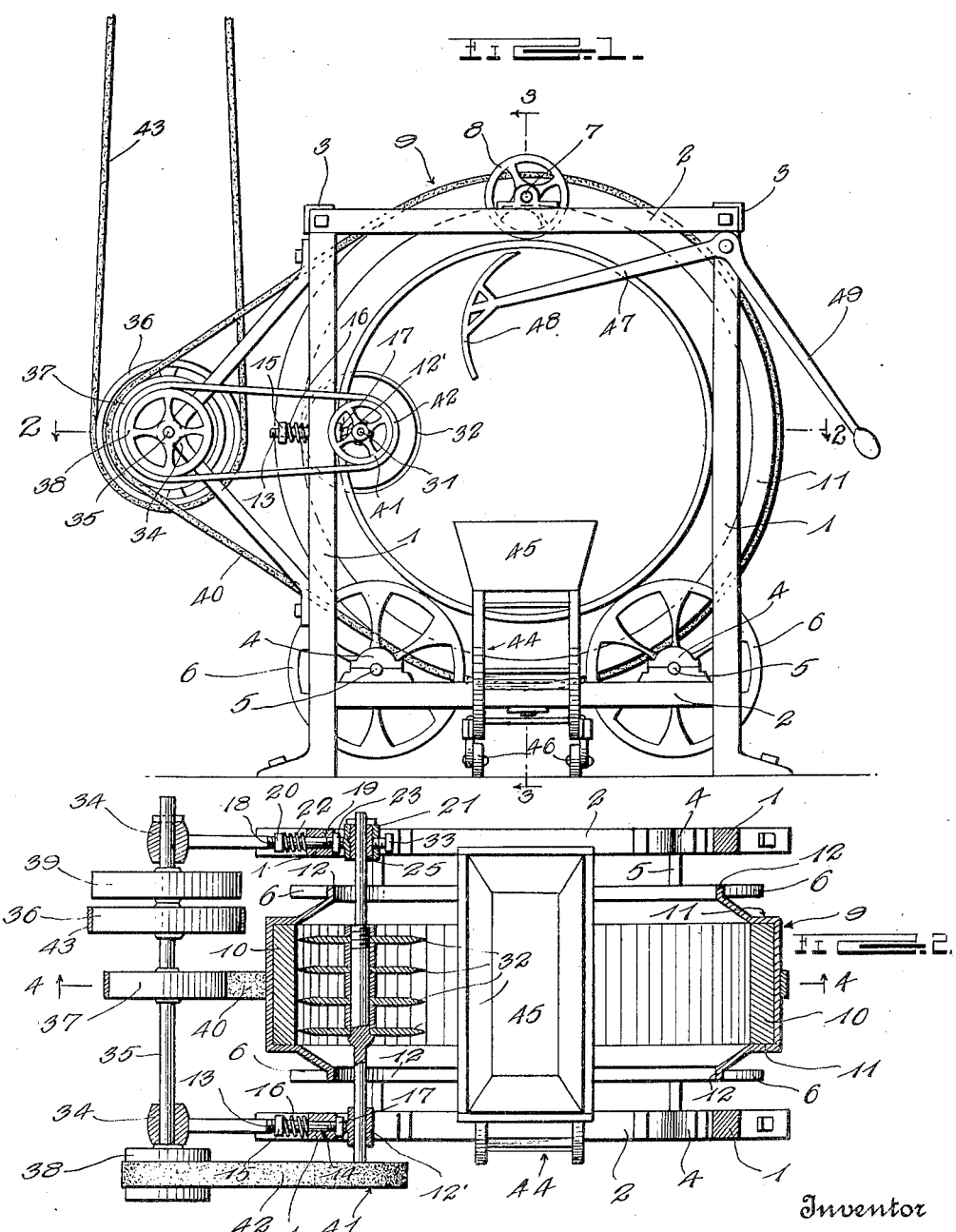

UNITED STATES PATENT OFFICE.

GEORGE REED NAPIER, OF CLEVELAND, OHIO.

MEAT-CHOPPING MACHINE.

1,346,096.	Specification of Letters Patent.	Patented July 6, 1920.

Application filed October 23, 1919. Serial No. 332,642.

*To all whom it may concern:*

Be it known that I, GEORGE R. NAPIER, a citizen of the United States, residing at Cleveland, in the county of Cuyahoga and State of Ohio, have invented certain new and useful Improvements in Meat-Chopping Machines; and I do declare the following to be a full, clear, and exact description of the invention, such as will enable others skilled in the art to which it appertains to make and use the same.

This invention relates generally to meat chopping machines, but more particularly to meat chopping machines which rely upon centrifugal force for feeding the meat to the cutters.

One object of the invention is to provide a centrifugal meat chopping machine in which the angularity between the cutters and the direction of rotation of the drum may be varied in order to effect a thorough chopping of the meat and to prevent the cutters from forming grooves by contact with the drum.

Another object of the invention is to provide a centrifugal meat chopping machine in which the cutters are mounted so that they will yield away from the surface of drum with which they contact should pieces of bone or the like pass between the cutters and the contacting surface of the drum.

A further object of the invention is to provide a centrifugal meat chopping machine with novel means for removing the meat after it has been chopped without stopping the machine.

A still further object of the invention is to provide a novel means for mounting the rotating drum of a centrifugal meat chopping machine.

With the above and other general objects in view, the invention consists of novel features of construction, and the combination and arrangement of parts as will be hereinafter fully described and claimed.

In the accompanying drawings forming a part of the specification, and in which similar reference characters designate like parts throughout the several views, Figure 1 is a front view of a machine constructed in accordance with this invention.

Fig. 2 is a horizontal sectional view through the machine taken on the plane indicated by the line 2—2 of Fig. 1.

Fig. 3 is a vertical transverse sectional view through the machine taken on the plane indicated by the line 3—3 of Fig. 1.

Fig. 4 is a central vertical longitudinal sectional view of the machine.

Fig. 5 is an enlarged vertical sectional view through the bearing at one end of the cutter shaft taken on the plane indicated by the line 5—5 of Fig. 3.

Fig. 6 is a sectional view taken on the plane indicated by line 6—6 of Fig. 5.

Fig. 7 is a perspective view of the frame which forms a part of the adjustable cutter shaft bearing, and Fig. 8 is a similar view of the block which forms another part of this bearing.

In the embodiment illustrated, the numerals 1 represent upright posts, 2 longitudinal upper and lower side bars, and 3 transverse bars, which make up the framework of the machine. Mounted in bearings 4 carried by the lower side bars 2 are shafts 5 which carry wheels 6. Two of such shafts 5 are shown, one being disposed adjacent each end of the lower side bars 2 and adjacent the upright posts 1, and each shaft carries a pair of the wheels 6 which are spaced apart and disposed close to the inner sides of the upright posts 1 and lower side bars 2. Upon stub axles 7 which are carried by and project inwardly from the intermediate portions of the upper side bars 2, are wheels 8, the latter being disposed in the vertical planes passing through the wheels 6.

The numeral 9 designates as a whole a drum, the intermediate portion of which is provided on its inner side with a plurality of transversely extending blocks 10. Extending inwardly from the intermediate portion of the drum are flanges 11, the free edges of which extend outwardly as at 12 and form tracks which run upon the wheels 6 and 8. The drum 9 is thus supported by the wheels 6, while the wheels 8 serve merely as idlers to prevent the drum from becoming disengaged from the wheels 6. As clearly shown by the drawings, the drum 9 is open at both ends.

One of the upright posts 1 disposed at one side of the machine is provided with a bearing 12', the latter being mounted upon said post so as to pivot and yield away from the same. The means for accomplishing such a mounting consists of a stem 13 which projects from the bearing 12 and extends through an opening 14 in the post. The free end of the stem 13 carries a nut 15 between which and the post 1 is confined a coil spring 16. Inward movement of the stem 13 and consequently the bearing 12 is limited by a nut 17 disposed upon the stem 13 and bearing against the other side of the post 1. It is to be understood that the stem 13 is free to turn within the opening 14 to effect the desired pivoting of the bearing 12.

Secured to the corresponding post 1 on the other side of the machine by means of bolts 18 extending through openings 19 in said post and nuts 20, is an open frame 21. Confined between the nuts 20 and the post 1 are coil springs 22 which allow the frame 21 to yield away from the post 1. Inward movement of the frame 21 is limited by means of nuts 23 which are disposed upon the bolts 18 and bear against the side of the post 1 opposite to that against which the springs 22 bear. The inner surface of the vertical sides of the frame 21 are provided with curved ridges 24. Slidable vertically between the vertical sides of the frame 21 is a block 25, the vertical sides of which are provided with curved grooves 26 in which the ridges 24 are received. The intermediate portion of the block 25 is provided with a bearing opening 27, the purpose of which will be hereinafter described. Pivoted at one end to ears 28 carried by the upper end of the frame 21 is a lever 29, to the intermediate portion of which is connected one end of a link 30, the other end of which is connected to the upper end of the block 25, so that by swinging the lever 29 upon its pivot the block 25 may be raised or lowered within the frame 21.

Mounted within the bearings 12 and 27 is a shaft 31 carrying a plurality of disk cutters 32. As clearly shown in Figs. 1 and 2 of the drawings, the shaft 31 extends transversely through the drum 9 and is located eccentrically with respect to the axis of the same. The block 25 may be moved up and down by rocking the lever 29 up and down so that the shaft 31 will be rocked upon its pivoted end and the cutters 32 carried thereby caused to run in zig-zag courses upon the inner surface of the drum. If desired, the block 25 may be locked against movement in the frame 21 by means of a set screw 33 which extends through one of the vertical sides of the frame 21 and has its inner end adapted to bear against the block.

Mounted in bearings 34 fixed to the upright posts 1 which carry the bearings 12 and 27 is a transverse shaft 35, the latter carrying fixed pulleys 36, 37 and 38 and a loose pulley 39. Passing around the pulley 37 and the periphery of the drum 9 is a belt 40 by which motion is imparted to the drum, and passing around the pulley 38 and the pulley 41 fixed to one end of the shaft 31 is a belt 42 by which motion is imparted to the shaft 31 and the cutters carried thereby. The shaft 35 is driven by a belt 43 which passes around the pulley 36. In order to stop the machine this belt 43 is shifted by means (not shown) to the loose pulley 39. The pulleys 37, 38 and 41 and the periphery of the drum are of such size that the edges of the cutters 32 will travel at a greater rate of speed than the inner curved surface of the drum.

The numeral 44 designates a C-shaped frame carrying a hopper or receptacle 45 upon its upper portion or arm and a number of caster wheels 46 upon its lower portion or arm. The device thus formed is a wagon and is adapted to be moved horizontally across the drum 9 with the receptacle moving within the latter and the portion of the frame 44 carrying the caster wheels 46 moving outside of the drum and beneath the lower side bars 2.

Carried at the free ends of arms 47 which are pivoted to corresponding upright posts 1 is a scraper 48, the latter being disposed within the drum 9 and being movable toward and away from the curved surface of the same as the arms 47 are swung upon their pivot by means of levers 49 connected to said arms. The scraper 48 is grooved and is arranged at such an angle to the curved surface of the drum that it will discharge into the receptacle 45 when the latter is disposed within the drum. It is preferable to locate the cutters on one side of the axis of the drum, the scraper above the axis of the drum and the receptacle beneath the scraper either above or below the axis of the drum.

In operation, the meat to be ground is placed in the rotating drum and is carried around in the same by the centrifugal force created by the rotation of the drum and thereby fed between the cutters. After the meat has received the desired chopping or mincing, the scraper 48 is moved upwardly into contact with the curved surface of the drum by pulling downwardly upon one or both of the levers 49. The meat thus scraped off of the curved surface of the drum by the scraper 48 is directed by said scraper into the receptacle 45, which it is to be understood is positioned directly beneath the scraper. The wagon carrying the receptacle 45 may then be moved away from the machine, and the scraper may be lowered out of contact with the curved surface of the drum, and additional meat may be placed within the latter. It will thus be seen that the machine does not have to be stopped when placing meat in the same or removing the chopped meat therefrom.

In order to thoroughly chop the meat and to prevent the cutters from forming grooves in the curved surface of the drum, the angularity between the cutters and the direction of rotation of the drum is varied by rocking the lever 29 so that the shaft 31 carrying the cutters will be rocked up and down upon its pivoted end. The cutters will thus travel in a zig-zag course along the interior surface of the drum. Sufficient thrust of the shaft 31 in its bearings 12' and 27 is provided to allow said shaft to shift transversely of the drum and permit the cutters to cover practically the entire width of the curved surface of the drum.

By having the cutter shaft yieldably mounted at both ends, no damage will be done to the cutters or other parts of the machine should a piece of bone or other hard substance be accidentally thrown into the drum with the meat to be ground and become interposed between the cutters and the curved surface of the drum.

Owing to the fact that the cutters are moved at a greater speed than the curved surface of the drum, the meat placed within the drum will be thoroughly chopped or minced.

From the foregoing description, taken in connection with the accompanying drawings, the construction, use and operation of the device will be readily understood without a more extended explanation.

Various changes in form, proportion and in the minor details of construction may be resorted to without departing from the spirit of the invention as defined in the appended claims.

What is claimed is:

1. A device of the class described comprising a rotating hollow drum, rotating cutters operating in said drum against the curved surface thereof, a scraper disposed within said drum and movable toward and away from the curved surface thereof, and a receptacle disposed within said drum.

2. A device of the class described comprising a hollow drum rotating about a horizontal axis, rotating cutters disposed in said drum on one side of the axis thereof and operating against the curved surface of the same, a receptacle disposed within said drum below the axis thereof, and a scraper disposed within said drum above the axis thereof and movable toward and away from the curved surface of the same, said scraper discharging into said receptacle.

3. A device of the class described comprising a rotating hollow drum open at one end, rotating cutters operating within said drum against the curved surface thereof, a receptacle movable in and out of the open end of said drum, and a scraper disposed within said drum and movable toward and away from the curved surface thereof, said scraper discharging into said receptacle when the latter is disposed within said drum.

4. A device of the class described comprising a hollow drum rotating about a horizontal axis and being open at one end, rotating cutters operating within said drum against the curved surface thereof, a receptacle movable horizontally in and out of the open end of said drum, and a scraper disposed within said drum and movable toward and away from the curved surface thereof, said scraper discharging into said receptacle when the latter is disposed within said drum.

5. A device of the class described comprising a hollow drum rotating about a horizontal axis and being open at one end, rotating cutters operating within said drum and against the curved surface thereof, a wagon consisting of a C-shaped frame adapted to move horizontally across said drum with its upper and lower portions respectively within and outside of the same, casters carried by the lower portion of said frame, a receptacle carried by the upper portion of said frame, and a scraper disposed within said drum and movable toward and away from the curved surface thereof, said scraper discharging into said receptacle when the latter is disposed within said drum.

6. A device of the class described comprising a frame, a rotating hollow drum floating upon said frame about a horizontal axis, rotating cutters disposed in said drum on one side of the axis thereof and operating against the curved surface of the same, a receptacle disposed within said drum below the axis thereof, and a scraper disposed within said drum above the axis thereof and movable toward and away from the curved surface of the scraper, said scraper discharging into said receptacle.

7. A device of the class described comprising a rotating hollow drum, rotating cutters operating within said drum against the curved surface thereof, and means for varying the angularity between said cutters and the direction of rotation of said drum.

8. A device of the class described comprising a rotating hollow drum, a rotating shaft mounted eccentrically within said drum, disk cutters fixed upon said shaft and operating against the curved surface of said drum, and means for varying the angularity of said shaft with respect to the axis of said drum so as to vary the angularity of said cutters with respect to the direction of rotation of said drum.

9. A device of the class described comprising a frame, a hollow drum open at both ends rotatably mounted in said frame, a shaft extending through said drum and located eccentrically with respect to the axis of the same, means for pivoting one end of said shaft to said drum, means for slidably mounting the other end of said shaft to said frame, cutters fixed upon said shaft and operating against the curved surface of said drum, and means for rocking said shaft upon its pivot so as to vary the angularity between said cutters and the direction of rotation of said drum.

10. A device of the class described comprising a frame, a hollow drum open at both ends rotatably mounted in said frame, a shaft extending through said drum and located eccentrically with respect to the axis of the same, a pivoted bearing in which one end of said shaft is journaled, a slidably mounted block in which the other end of said shaft is journaled, cutters fixed upon said shaft and operating against the curved surface of said drum, and a lever operatively connected with said block for moving the latter back and forth and rocking said shaft upon its pivot so as to vary the angularity between said cutters and the direction of rotation of said drum.

11. A device of the class described comprising a rotating hollow drum, rotating cutters disposed in said drum and operating against the curved surface thereof, and means for yieldably mounting said cutters so that the same will yield away from the curved surface of said drum.

12. A device of the class described comprising a rotating hollow drum, rotating cutters disposed in said drum and operating against the curved surface of the same, and means for driving said cutters at a greater speed than the speed of the curved surface of said drum.

In testimony whereof I have hereunto set my hand.

GEORGE REED NAPIER.